United States Patent [19]
Fay

[11] Patent Number: 5,609,934
[45] Date of Patent: Mar. 11, 1997

[54] METHOD OF MANUFACTURING HEAT BONDED GLASS FIBER INSULATION BOARDS

[75] Inventor: Ralph M. Fay, Lakewood, Colo.

[73] Assignee: Schuller INternational, Inc., Denver, Colo.

[21] Appl. No.: 369,204

[22] Filed: Jan. 5, 1995

[51] Int. Cl.[6] .................................................. B32B 1/04
[52] U.S. Cl. ................... 428/74; 65/34; 65/36; 65/102; 65/104; 65/376; 156/308.2; 428/68; 428/76; 428/920; 442/391
[58] Field of Search .................................. 428/280, 282, 428/284, 285, 296, 297, 298, 920, 903, 68, 74, 76; 65/34, 36, 102, 104, 376; 156/308.2

[56] References Cited

U.S. PATENT DOCUMENTS 5,330,816  7/1994  Rusek, Jr. ................................. 428/69

OTHER PUBLICATIONS

"Flat Panel Thermal Insulation", H. M. Strong et al, Journal Of Applied Physics, vol. 3, #1, Jan. 1960.

Primary Examiner—James J. Bell
Attorney, Agent, or Firm—Cornelius P. Quinn

[57] ABSTRACT

An insulation panel is formed comprising a binderless, heat bonded glass fiber insulation board encapsulated within a partially evacuated, gas-tight envelope. The insulation board is formed by laying down discrete length glass fibers into a thin glass fiber mat with the glass fibers lying predominately in and randomly oriented in planes extending substantially parallel to the major surfaces of the thin glass fiber mat. The thin glass fiber mat is layered to form an uncompressed thick glass fiber blanket. The thick glass fiber blanket is heated to a temperature between about 25° C. below and about 20° C. above the strain temperature of the glass fibers; compressed to its final thickness and density; and cooled to form the binderless, heat bonded glass fiber insulation board having glass fibers lying predominately in planes which extend parallel to the major surfaces of the insulation board. The insulation board is encapsulated within the gas-tight envelope to form the insulation panel.

16 Claims, 1 Drawing Sheet

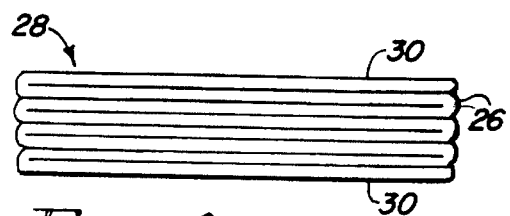
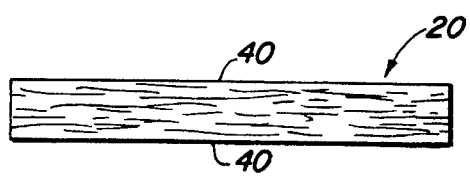
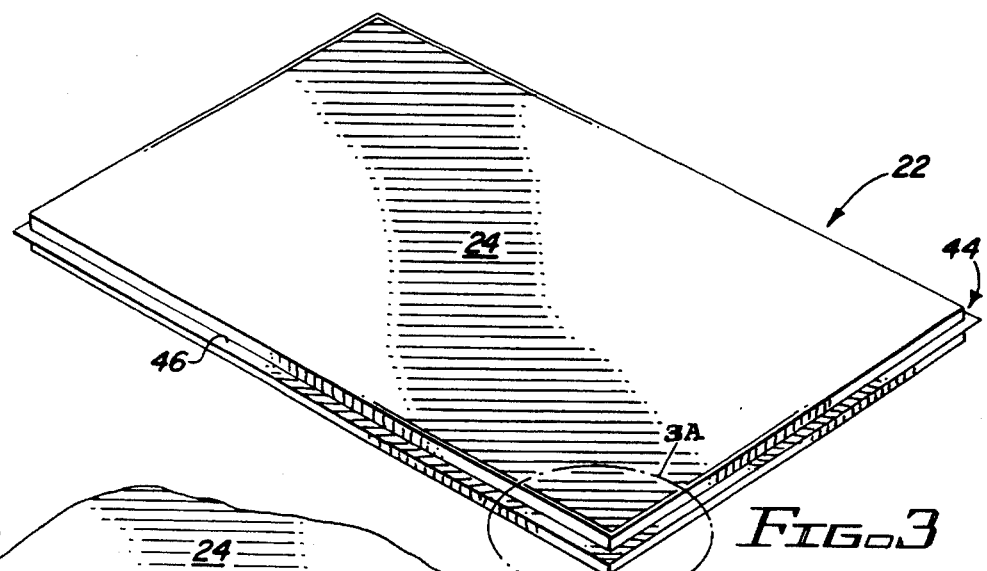
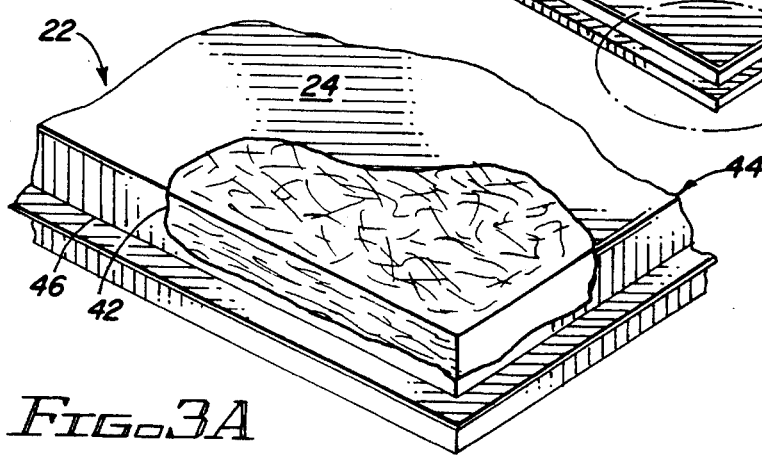
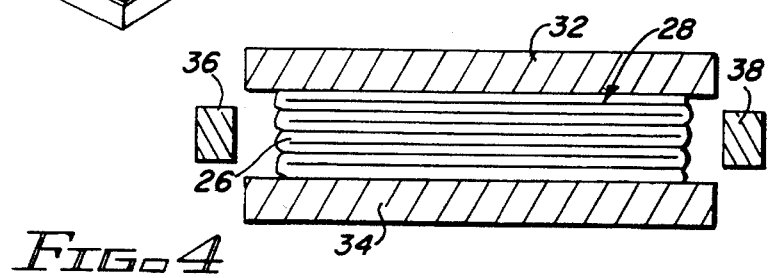
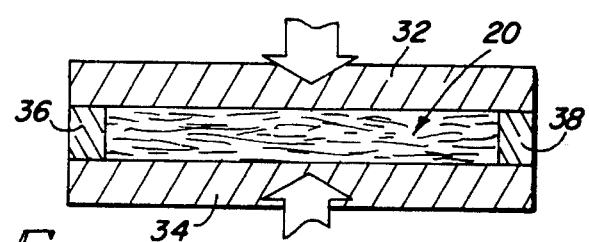

METHOD OF MANUFACTURING HEAT BONDED GLASS FIBER INSULATION BOARDS

BACKGROUND OF THE INVENTION

The invention is directed to the manufacture of heat bonded glass fiber insulation boards and, in particular, to low cost, high performance glass fiber insulation boards well suited for use in vacuum panels.

One of the most effective types of thermal insulation structures is a vacuum panel. However, one of the problems associated with vacuum panels, especially flat or substantially flat vacuum panels, is the need to provide support for the major surfaces of the vacuum panels, which are subjected to a compressive loading of up to one atmosphere, without greatly increasing the thermal conductivity of the vacuum panel. Most mechanical supports within a vacuum panel will greatly increase the thermal conductivity of the vacuum panel. However, as discussed in an article by H. M. Strong et al, entitled "Flat Panel Vacuum Thermal Insulation", contained in the Journal Of Applied Physics, vol. 31, #1, January 1960; a pad "of glass fibers oriented randomly in planes parallel to the pad (perpendicular to the temperature gradient)" can be used to support the walls of an insulation structure while maintaining a suitably low thermal conductivity through the proper geometric distribution of the support material. On page 46 of the Strong et al article, the formation of a glass mat by compressing the glass fiber to nearly its ultimate density and heating the glass fiber above the strain point of the glass is discussed.

While disclosing an evacuated flat-panel thermal insulation which uses a glass mat or pad with the glass fibers oriented to provide low thermal conductivity, the Strong et al article does not disclose a method of forming thin mats of glass fibers with the glass fibers in the proper geometric orientation to provide the mats with low thermal conductivities or a method of forming thick blankets of glass fibers with the glass fibers in the proper geometric orientation so that the thick glass fiber blankets can be formed into heat bonded glass fiber insulation panels having low thermal conductivities.

U.S. Pat. No. 5,330,816, issued Jul. 19, 1994, and entitled "High R Super Insulation Panel" discloses an insulation panel comprising an insulation board of heat bonded glass fibers encapsulated within a gas-tight envelope. While the patent discusses forming the glass fibers of the insulation board by a rotary process, the '816 patent does not disclose how the glass fibers are collected to form the glass fiber board or the fiber orientation of the glass fibers in the insulation board.

SUMMARY OF THE INVENTION

The present invention is directed to a method for producing heat bonded glass fiber insulation boards of various thickness on a commercial basis. The heat bonded glass fiber insulation boards are low cost, high performance glass fiber insulation boards particularly suited for use in partially evacuated gas-tight envelope insulation structures referred to as vacuum panels.

Preferably, the glass fibers of the glass fiber insulation board of the present invention are formed by chopping continuous or long staple tow glass filaments into discrete lengths suitable for dry laying into thin glass fiber mats and are at least six microns in diameter so that the glass fibers are not respirable. In a preferred embodiment of the invention, the discrete length glass fibers are dry laid to form thin glass fiber mats having weights between 5 and 50 g/m². By dry laying the glass fibers to form light weight, thin glass fiber mats, the glass fibers in the mats predominately lie in and are randomly oriented in planes extending parallel or substantially parallel to the major surfaces of the thin glass fiber mat.

The light weight, thin glass fiber mat is then lapped back and forth upon itself or otherwise layered to form an uncompressed thick glass fiber blanket between 3 and 40 centimeters thick that can be heated and compressed to form a binderless, heat bonded glass fiber insulation board of sufficient density and integrity to withstand one atmosphere of pressure without any significant thickness change (10% or less) in the board. To form the binderless, heat bonded glass fiber insulation board, the thick glass fiber blanket is heated to a temperature between about 25° C. below and about 20° C. above the strain temperature of the glass fibers, and preferably, to a temperature equal to or about equal to the strain temperature of the glass fibers for a sufficient period of time (e.g. up to about 40 to 60 minutes) to form a heat bonded insulation board of the required integrity. Preferably, the glass fiber blanket is simultaneously compressed to its final density and thickness. The binderless, heat bonded glass fiber insulation board is then cooled to complete the formation of the binderless, heat bonded glass fiber insulation board. With the compression of the thick glass fiber blanket into the relatively thin binderless, glass fiber insulation board, the discrete length glass fibers in the binderless, heat bonded glass fiber insulation board lie predominately in planes extending parallel to the major surfaces of the insulation board (at least 80% of the glass fibers in the binderless, heat bonded glass fiber insulation board lie in planes extending parallel to the major surfaces of the binderless, heat bonded glass fiber insulation board or in planes inclined to these parallel planes at angles of no more than 10°). Since the discrete length glass fibers lie predominately in planes extending parallel to the major surfaces of the heat bonded glass fiber insulation board, the heat bonded glass fiber insulation board has a low thermal conductivity between it major surfaces. The heat bonded glass fiber insulation board is encapsulated within a partially evacuated, gas-tight envelope to form an insulation panel.

The thin glass fiber mats have also been made by wet laying the discrete length glass fibers. However, this method of forming the thin glass fiber mats has at least two drawbacks. Any moisture and/or organic materials, such as sizings and lubricants, on the discrete length glass fibers of the thick glass fiber blanket being formed into the heat bonded glass fiber insulation board must be removed during the formation of the heat bonded glass fiber insulation board. Otherwise, after the heat bonded glass fiber insulation board is encapsulated within its gas-tight envelope, gases can evolve into the gas-tight envelope of the insulation panel from any organic materials and moisture retained within the heat bonded glass fiber insulation board thereby at least partially eliminating the vacuum formed within the gas-tight envelope during the manufacturing process and reducing the thermal performance of the insulation panel. By forming the thin glass fiber mats in a wet laid process, water and organic materials are added to the discrete length glass fibers. The need to remove these added materials from the glass fibers increases the energy requirements and thus the costs of producing the product.

It has also been found that binderless, heat bonded glass fiber insulation boards made from thick glass fiber blankets of layered, wet laid, thin glass fiber mats (typically 20 or more layers of mat) lack the integrity of the binderless, heat bonded glass fiber insulation boards made from thick glass fiber blankets formed from layered, dry laid, thin glass fiber mats. Accordingly, for the purposes of the present invention it is preferred to form the thin glass fiber mats by dry laying the glass fibers.

BRIEF DESCRIPTION OF THE DRAWINGS

FIG. 1 is a schematic view showing the formation of the thick, uncompressed glass fiber blanket by lapping a thin glass fiber mat back and forth upon itself.

FIG. 2 is a section through a heat bonded glass fiber insulation board of the present invention showing the glass fibers lying in planes extending parallel to the major surfaces of the heat bonded glass fiber insulation board.

FIGS. 3 and 3A is a perspective view of an insulation panel of the present invention with a portion broken away to show the discrete length glass fibers of the heat bonded insulation board lying in planes extending parallel to the major surfaces of the insulation panel and being randomly oriented within those planes.

FIG. 4 is a schematic cross sectional view in elevation of the uncompressed, thick glass fiber blanket between the upper, lower and side platens prior to the heating and compression of the blanket to form the heat bonded glass fiber insulation board.

FIG. 5 is a schematic cross sectional view in elevation of the thick glass fiber blanket being compressed and heated by the upper, lower and side platens to form the heat bonded glass fiber insulation board.

DESCRIPTION OF THE PREFERRED EMBODIMENTS

The heated bonded glass fiber insulation boards 20 of the present invention are designed for use in partially evacuated, gas-tight envelope applications, such as vacuum panels 22. The heat bonded glass fiber insulation boards 20 exhibit sufficient load bearing capability to support the major surfaces 24 of the vacuum panels 22 without any significant change (10% or less) in the thickness of the vacuum panel and exhibit a low thermal conductivity in a direction perpendicular to the major surfaces 24 of the vacuum panel 22.

The heat bonded glass fiber insulation boards 20 are formed from discrete length glass fibers. The discrete length glass fibers are formed from continuous or long staple tow glass filaments which are drawn from bushings, are substantially uniform in diameter, and preferably, are between 6.0 and 16 microns in diameter. The continuous or long staple tow glass filaments are chopped into discrete length glass fibers between 50 and 250 millimeters in length. The resulting discrete length glass fibers are between 6.0 and 16 microns in diameter, are between 50 and 250 millimeters in length, and may have a small amount (typically less than 0.5% by weight) of a sizing or lubricant to facilitate the dry laying of the discrete length glass fibers to form the thin glass fiber mat 26 of the present invention. These discrete length glass fibers are not respirable and are well suited to be dry laid to form the thin glass fiber mat 26.

The method of the present invention includes the heating of the discrete length glass fibers to a temperature between about 25° C. below and about 20° C. above the strain temperature of the glass fibers (such a temperature is below the softening point temperature of the glass fibers) to bond the discrete length glass fibers together at their points of intersection within the glass fiber insulation board 20. Accordingly, to minimize the energy consumption of the process, it is preferred to use a glass composition for the continuous glass filaments that has a strain temperature below 500° C.

The binderless, heat bonded glass fiber insulation board 20 of the present invention exhibits very good integrity even though no binder is present in the board. The bonding mechanism between the glass fibers in the binderless, heat bonded insulation board 20 may not be fully understood. However, it is believed that heating the glass fibers to a temperature between about 25° C. below and about 20° C. above their strain temperature and preferably, to a temperature equal to or about equal to the strain temperature of the glass fibers, while simultaneously compressing the layered blanket 28, causes a viscous flow of the glass of the glass fibers which allows the glass fibers to deform and conform to their new compressed orientation. In addition, the process appears to set up an attractive force (a chemical bond) between the glass fibers that holds the glass fibers together at their points of intersection.

After the discrete length glass fibers are formed, the discrete length glass fibers are dry laid, using an air laid machine such as a Rando-Weber machine or a similar conventional air laid machine, to form the thin glass fiber mat 26 which typically has a weight of between 5 and 50 g/m². By dry laying the discrete length glass fibers to form the thin glass fiber mat and by keeping the glass fiber mat 26 thin (i.e. between 5 and 50 g/m²), the discrete length glass fibers predominately lie in and are randomly oriented in planes extending parallel or substantially parallel to the major surfaces of the thin glass fiber mat 26.

After the thin glass fiber mat 26 is formed, the thin glass fiber mat is layered to form an uncompressed, thick, glass fiber blanket 28 (preferably between 3 and 40 centimeters thick and weighing between 2.5 and 9.0 kg/m²) that has the thickness and weight required to be formed into the heat bonded glass fiber insulation board 20. As shown in FIG. 1, preferably, the thin glass fiber mat 26 is lapped back and forth upon itself to form the uncompressed, multilayered, thick glass fiber blanket 28. The discrete length glass fibers of each layer of the uncompressed, thick glass fiber blanket 28 lie predominately in planes extending parallel to or substantially parallel to the major surfaces 30 of the uncompressed, thick glass fiber blanket 28 and are randomly oriented in these planes.

While the uncompressed, thick glass fiber blanket 28 can be preheated prior to compression, preferably, the uncompressed, thick glass fiber blanket 28 is heated to a heat setting temperature between about 25° C. below and about 20° C. above the strain temperature of the glass fibers (preferably, to a temperature equal to or about equal to the strain temperature of the glass fibers) and simultaneously, compressed to its ultimate heat bonded glass fiber insulation board density (preferably between 200 and 350 kg/m³) and thickness. The compressed glass fiber blanket 28 is held under compression at the heat setting temperature typically, for from about 15 to about 40 to 60 minutes, until the heat bonded insulation board has the desired integrity (e.g. the cooled, heat bonded insulation board is capable of withstanding a pressure of about 1.03 kg/cm² with a reduction in thickness of 10% or less). After the heat bonding step, the heat bonded glass fiber insulation board 20 is allowed to cool on a flat surface to a temperature preferably at least 100° C. below the strain temperature of the glass fibers (e.g. typically, to about 300° Centigrade for a glass having a strain temperature of about 500° Centigrade) to bond the glass fibers together at their points of intersection and form the binderless, heat bonded glass fiber insulation board of the present invention.

The thick glass fiber blanket 28 can be heated and compressed between heated, reciprocating upper and lower platens 32 and 34 and heated, reciprocating side platens 36 and 38, as shown in FIGS. 4 and 5 to form the heat bonded glass fiber insulation board 20 or the thick glass fiber blanket 28 can be heated and compressed between upper and lower heated oven flights (not shown) to form the heat bonded glass fiber insulation board.

As the thick, glass fiber blanket 28 is being heated and compressed to form the binderless, heat bonded glass fiber insulation board 20, the blanket 28 should be maintained at the heat setting temperature for a sufficient period of time to completely remove all organic sizings and lubricants from the glass fibers if organic sizings and lubricants are used in the process and present on the glass fibers of the blanket 28. The blanket should also be maintained at the heat setting temperature for a sufficient period of time (e.g. about 15 minutes) to remove all water chemically bonded to the surfaces of the glass fibers (typically less than 0.5% by weight). It is important to remove the organic materials and chemically bonded water from the glass fibers to assure minimal outgassing from the glass fibers in the vacuum panel 22. In addition, by removing the water that is chemically bonded to the surfaces of the glass fibers, the surfaces of the glass fibers within the vacuum panel 22 can function as a desiccant (gas absorber) thereby reducing the amount of desiccant and/or getter material required to be added to the vacuum panel to maintain an acceptable vacuum over the life expectancy of the finished vacuum panel 22.

The discrete length glass fibers in the binderless, heat bonded glass fiber insulation board 20 lie predominately in planes extending parallel to the major surfaces 40 of the heat bonded glass fiber insulation board 20 (i.e. at least 80% and preferably 90% of the glass fibers in the heat bonded glass fiber insulation board lie in planes extending parallel to the major surfaces of the heat bonded glass fiber insulation board or lie in planes that are inclined to these planes at angles of no more than 10°) and are randomly oriented in these planes. Accordingly, up to 20%, but preferably, no more than 10% of the discrete length glass fibers in the binderless, heat bonded glass fiber insulation board 20 can be oriented at angles of greater than 10° to planes extending parallel to the major surfaces of the binderless, heat bonded, glass fiber insulation board 20. With this orientation of the discrete length glass fibers within the heat bonded glass fiber insulation board 20, the thermal conductivity of the heat bonded glass fiber insulation board between the major surfaces 40 of the heat bonded glass fiber insulation board or perpendicular to the planes of the discrete length glass fibers is very low.

At densities between 200 and 350 kg/m$^3$, the binderless, heat bonded glass fiber insulation boards 20 exhibit a compression resistance sufficient to minimize (10% or less) any change in the thickness of the vacuum panels 22, within which the binderless, heat bonded glass fiber insulation boards are used, due to the compressive forces exerted on the major surfaces of the binderless, heat bonded glass fiber insulation boards 20 by the skins 42 of the vacuum panel envelope 44. Since the vacuum panels 22 are partially evacuated, the compressive forces exerted by the skins 42 of the envelopes 44 on the major surfaces of the binderless heat bonded glass fiber insulation board 20 are about 1.03 kg/cm$^2$ or about one atmosphere of pressure. The binderless, heat bonded glass fiber insulation boards 20 of the present invention also exhibit good integrity and low dust properties which facilitates the handling of the insulation boards during the encapsulating process and the fabrication of the vacuum panels 22. Binderless, heat bonded glass fiber insulation board samples, having a thickness of 13 mm and an average density of about 280 kg/m$^3$, have shown good integrity, adequate stiffness for "one hand" handling of pieces up to 0.5 m$^2$, and well bonded fibers. "One hand" handling means that these binderless, heat bonded glass fiber insulation boards 20 can be supported by one hand at their centers in a horizontal position with substantially no visible sagging.

As shown in FIG. 3, the binderless, heat bonded glass fiber insulation board 20 is encapsulated within an envelope 44 which is then partially evacuated and sealed by conventional means to form the finished vacuum panel 22. The envelope 44 is typically made of a thin material, such as a multilayer polymeric film or stainless steel sheet. The encapsulating envelope 44 is typically made in two pieces which are heat bonded, welded or otherwise joined together along tabs 46.

Binderless, heat bonded glass fiber insulation boards made in accordance with the method of the present invention demonstrated the center point thermal performance set forth in the following table. The binderless, heat bonded glass fiber insulation boards were 2.0 cm (0.80 inch) thick; were evacuated to 0.001 mm Hg (10$^{-3}$ torr); and were compressed under a load of one atmosphere (1.03 kg/cm$^2$) using ASTM test C-518.

| GLASS FIBER DIA. MICRONS | DENSITY (kg/m$^3$) | THERMAL PERFORMANCE k[W/(m − k)] | EQUIVALENT R-VALUE/IN. |
| --- | --- | --- | --- |
| 7 | 260 | 0.0015 | 96 |
| 13 | 290 | 0.0015 | 96 |
| 16 | 290 | 0.0017 | 84 |

The conductivity of the encapsulating envelope influences the overall thermal performance of the finished vacuum panel. A low conductivity envelope made from a multilayer polymeric film material reduces the above reported center point thermal performances by approximately 5% for square shaped 0.15 m$^2$ vacuum panels. A moderately conductive envelope, such as a 3 mil thick stainless steel envelope, reduces the above reported center point thermal performances by as much as 35% for square shaped 0.15 m$^2$ vacuum panels.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of manufacturing an insulation panel having a binderless, heat bonded glass fiber insulation board comprising:

laying discrete length glass fibers into a thin glass fiber mat with said discrete length glass fibers predominately lying in and randomly oriented in planes extending substantially parallel to major surfaces of said thin glass fiber mat;

layering said thin glass fiber mat to form an uncompressed, thick glass fiber blanket having first and second major surfaces, said thick glass fiber blanket comprising multiple layers of said thin glass fiber mat with said discrete length glass fibers of each layer of said thick glass fiber blanket predominately lying in planes extending substantially parallel to said first and second major surfaces of said thick glass fiber blanket;

heating said thick glass fiber blanket to a temperature between about 25° C. below and about 20° C. above the strain point temperature and below the softening point temperature of said discrete length glass fibers;

compressing said thick glass fiber blanket to a final thickness and density, while said glass fiber blanket is heated to said temperature, to form a heat bonded glass fiber insulation board of discrete length glass fibers with at least 80% of said discrete length glass fibers lying in planes extending parallel to or at angles of no more than 10° to first and second major surfaces of said binderless, heat bonded glass fiber insulation board and perpendicular to an intended path of heat flow through said heat bonded glass fiber insulation board; and allowing said binderless, heat bonded glass fiber insulation.

2. The method of manufacturing the insulation panel with the binderless, heat bonded glass fiber insulation board of claim 1, wherein: said thin glass fiber mat is layered to form said thick glass fiber blanket by lapping a continuous length of said thin glass fiber mat back and forth upon itself.

3. The method of manufacturing the insulation panel with the binderless heat bonded glass fiber insulation board of claim 1, wherein:

said discrete length glass fibers are formed by chopping glass filaments into discrete lengths, said discrete length glass fibers have an average fiber diameter between 6.0 and 16.0 microns and said discrete length glass fibers have an average length between 50 and 250 mm;

said thin glass fiber mat is formed with a weight between 5 and 50 g/m²; and said thick glass fiber blanket is formed with an uncompressed thickness between 3 and 40 cm and with a weight between 2.5 and 9.0 kg/m².

4. The method of manufacturing the insulation panel with the binderless, heat bonded glass fiber insulation board of claim 3, wherein: said thick glass fiber blanket is compressed to form said binderless, heat bonded glass fiber insulation board with a density between 200 and 350 kg/m³ that is capable of withstanding a compressive force of about 1.03 kg/cm² without any significant change in thickness of said heat bonded glass fiber insulation board.

5. The method of manufacturing the insulation panel with the binderless, heat bonded glass fiber insulation board of claim 4, wherein: said thick glass fiber blanket is maintained at an elevated temperature to remove substantially all organic materials and chemically bound water from the surfaces of said discrete length glass fibers.

6. The method of manufacturing the insulation panel with the binderless, heat bonded glass fiber insulation board of claim 5, wherein: said binderless, heat bonded glass fiber insulation board is covered by a gas-tight encapsulating envelope and said encapsulating envelope is partially evacuated.

7. The method of manufacturing the insulation panel with the binderless, heat bonded glass fiber insulation board of claim 1, wherein: said thin glass fiber mat is formed by dry laying said discrete length glass fibers.

8. The method of manufacturing the insulation panel with the binderless, heat bonded glass fiber insulation board of claim 1, wherein: said thin glass fiber mat is formed by wet laying said discrete length glass fibers.

9. A method of manufacturing an insulation panel having a binderless, heat bonded glass fiber insulation board comprising:

dry laying discrete length glass fibers into a thin glass fiber mat with said discrete length glass fibers predominately lying in and randomly oriented in planes extending substantially parallel to first and second major surfaces of said thin glass fiber mat;

layering said thin glass fiber mat to form an uncompressed, thick glass fiber blanket having first and second major surfaces, said thick glass fiber blanket comprising multiple layers of said thin glass fiber mat with said discrete length glass fibers of each layer of said thick glass fiber blanket predominately lying in planes extending parallel to said first and second major surfaces of said thick glass fiber blanket;

heating said thick glass fiber blanket to a temperature between about 25° C. below and about 20° C. above the strain point temperature and below the softening point temperature of said discrete length glass fibers;

compressing said thick glass fiber blanket to a final thickness and density, while said glass fiber blanket is heated to said temperature, to form a binderless, heat bonded glass fiber insulation board of discrete length glass fibers with at least 80% of said discrete length glass fibers lying in planes extending parallel to or at no more than 10° to first and second major surfaces of said heat bonded glass fiber insulation board and perpendicular to an intended path of heat flow through said heat bonded glass fiber insulation board and capable, when cooled, of withstanding a compressive force of about 1.03 kg/cm² exerted on said first and second major surfaces of said heat bonded glass fiber insulation board without any significant change in the thickness of the heat bonded glass fiber insulation board;

allowing said heat bonded glass fiber insulation board to cool to a temperature at least 100° C. below said strain point temperature; and covering said heat bonded glass fiber insulation board in a gas-tight encapsulating envelope and partially evacuating air from said gas tight encapsulating envelope.

10. The method of manufacturing the insulation panel with the binderless, heat bonded glass fiber insulation board of claim 9, wherein: said thin glass fiber mat is layered to form said thick glass fiber blanket by lapping a continuous length of said thin glass fiber mat back and forth upon itself.

11. The method of manufacturing the insulation panel with the binderless, heat bonded glass fiber insulation board of claim 9, wherein:

said discrete length glass fibers are formed by chopping glass filaments into discrete lengths, said discrete length glass fibers have an average diameter between 6.0 and 16.0 microns, and said discrete length glass fibers have an average length between 5 and 250 mm;

said thin glass fiber mat is formed with a weight between 5 and 50 g/m²;

said thick glass fiber blanket is formed with an uncompressed thickness between 3 and 40 cm and with a weight between 2.5 and 9.0 kg/m²; and said binderless, heat bonded glass fiber insulation board is formed with a density between 200 and 350 kg/m³.

12. The method of manufacturing the insulation panel with the binderless, heat bonded glass fiber insulation board of claim 9, wherein: said discrete length glass fibers are formed by chopping glass filaments having substantially uniform diameters and said discrete length glass fibers have fiber diameters of 6.0 microns or greater.

13. The method of manufacturing the insulation panel with the binderless, heat bonded glass fiber insulation board of claim 1, wherein: said thick glass fiber blanket is heated to a temperature about equal to said strain point temperature for a period of from about 15 to about 60 minutes.

14. The method of manufacturing the insulation panel with the binderless, heat bonded glass fiber insulation board of claim 9, wherein: said thick glass fiber blanket is heated to a temperature about equal to said strain temperature for a period of from about 15 to 60 minutes.

15. An insulation panel comprising: an insulation panel made according to the method of claim 1.

16. An insulation panel comprising: an insulation panel made according to the method of claim 9.

* * * * *